United States Patent
Niemela

(10) Patent No.: US 9,407,650 B2
(45) Date of Patent: Aug. 2, 2016

(54) UNAUTHORISED/MALICIOUS REDIRECTION

(71) Applicant: F-Secure Corporation, Helsinki (FI)

(72) Inventor: Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/557,552

(22) Filed: Dec. 2, 2014

(65) Prior Publication Data

US 2015/0163236 A1    Jun. 11, 2015
US 2016/0149942 A2    May 26, 2016

(30) Foreign Application Priority Data

Dec. 9, 2013 (GB) .................................. 1321755.9

(51) Int. Cl.
    *H04L 29/06*      (2006.01)

(52) U.S. Cl.
    CPC ........ *H04L 63/1425* (2013.01); *H04L 63/1408* (2013.01); *H04L 63/1466* (2013.01); *H04L 63/1483* (2013.01)

(58) Field of Classification Search
    CPC ............ H04L 63/1425; H04L 63/1466; H04L 63/1408; H04L 63/1483; H04L 63/14; H04L 63/1441; H04L 63/145; H04L 2463/145
    See application file for complete search history.

(56) References Cited

U.S. PATENT DOCUMENTS

| | | | |
|---|---|---|---|
| 7,516,488 B1 | 4/2009 | Kienzle et al. | 726/22 |
| 7,823,202 B1* | 10/2010 | Nucci et al. | 726/22 |
| 8,176,556 B1* | 5/2012 | Farrokh et al. | 726/23 |
| 8,381,292 B1* | 2/2013 | Warner et al. | 726/22 |
| 8,695,100 B1* | 4/2014 | Cosoi | G06F 21/554 |
| | | | 713/187 |
| 8,984,640 B1* | 3/2015 | Emigh et al. | 726/25 |
| 2006/0080735 A1* | 4/2006 | Brinson et al. | 726/22 |
| 2006/0101120 A1* | 5/2006 | Helsper et al. | 709/206 |
| 2006/0123464 A1* | 6/2006 | Goodman | H04L 63/1416 |
| | | | 726/2 |
| 2006/0248600 A1* | 11/2006 | O'Neill | G06F 17/30861 |
| | | | 726/29 |
| 2006/0253446 A1 | 11/2006 | Leong et al. | 707/9 |
| 2006/0253578 A1* | 11/2006 | Dixon et al. | 709/225 |
| 2007/0153763 A1 | 7/2007 | Rampolla et al. | 370/351 |
| 2007/0192855 A1* | 8/2007 | Hulten et al. | 726/22 |
| 2007/0261112 A1* | 11/2007 | Todd et al. | 726/11 |
| 2008/0016552 A1* | 1/2008 | Hart | 726/3 |
| 2008/0028444 A1* | 1/2008 | Loesch et al. | 726/4 |

(Continued)

FOREIGN PATENT DOCUMENTS

WO    WO 2009/082306 A1    7/2009

*Primary Examiner* — Darren B Schwartz
(74) *Attorney, Agent, or Firm* — Harrington & Smith

(57) ABSTRACT

Method(s) and apparatus are described for use in preventing unauthorized redirection and/or routing of packets transmitted in a communication network. Packets generated by one or more devices in the communications network are intercepted by an apparatus. The intercepted packets are inspected and it is detected whether at least one of the intercepted packets is associated with redirection based on an unauthorized destination. For each intercepted packet, packet and protocol inspection may be used to determine the originally intended destination of the packet and to determine any other destination(s) associated with redirection of the packet. For each intercepted packet, if the any other destination(s) are not associated with one or more authorized destinations corresponding to the originally intended destination, then the intercepted packet is associated with redirection to an unauthorized destination. Those detected intercepted packets associated with redirection based on the unauthorized destination are blocked or corrected.

22 Claims, 8 Drawing Sheets

(56) References Cited

U.S. PATENT DOCUMENTS

| | | | |
|---|---|---|---|
| 2008/0060054 A1* | 3/2008 | Srivastava | 726/2 |
| 2008/0082662 A1* | 4/2008 | Dandliker et al. | 709/225 |
| 2008/0127338 A1* | 5/2008 | Cho et al. | 726/22 |
| 2008/0147837 A1* | 6/2008 | Klein et al. | 709/223 |
| 2008/0201401 A1* | 8/2008 | Pugh et al. | 709/201 |
| 2008/0222730 A1* | 9/2008 | Ford | H04L 63/0236 726/25 |
| 2008/0281983 A1* | 11/2008 | Cooley et al. | 709/245 |
| 2009/0089426 A1* | 4/2009 | Yamasaki et al. | 709/225 |
| 2009/0300768 A1* | 12/2009 | Krishnamurthy et al. | 726/26 |
| 2010/0031041 A1* | 2/2010 | Cohen | 713/168 |
| 2010/0121981 A1* | 5/2010 | Drako | 709/245 |
| 2010/0218253 A1* | 8/2010 | Sutton et al. | 726/23 |
| 2011/0191455 A1* | 8/2011 | Gardner | 709/223 |
| 2011/0282997 A1* | 11/2011 | Prince | H04L 63/1458 709/226 |
| 2011/0314546 A1* | 12/2011 | Aziz et al. | 726/24 |
| 2013/0036468 A1* | 2/2013 | Georgiev | 726/23 |
| 2013/0263263 A1* | 10/2013 | Narkolayev et al. | 726/22 |
| 2013/0318170 A1* | 11/2013 | Crume | 709/206 |
| 2013/0333038 A1* | 12/2013 | Chien | 726/23 |
| 2015/0170072 A1* | 6/2015 | Grant et al. | 705/7.36 |

* cited by examiner

UNAUTHORISED/MALICIOUS REDIRECTION

TECHNICAL FIELD

The present invention relates to detecting when packet traffic transmitted in a communication network is associated with redirection based on an unauthorised or malicious destination. In particular, the invention relates to methods, apparatus and systems for intercepting packet traffic, determining whether it is associated with redirection based on an unauthorised or malicious destination, and blocking/correcting that packet traffic being so redirected.

BACKGROUND

Malware is short for malicious software and is used as a term to refer to any software designed to infiltrate or damage a client device or computing system such as a computer, set-top box, or mobile device without the owner's informed consent. Malware can include computer viruses, worms, Trojan horses, rootkits, adware, spyware, botnets or botnet control and command software and any other malicious or unwanted software. The vulnerability of client devices to attack by malware and other intrusion processes such as botnets (often referred to as computer "infections") is widely acknowledged. Cautious users and system operators will protect their client devices and systems by deploying appropriate security applications including antivirus applications. Security applications will introduce firewalls to defend against intrusion, as well as various engines to detect and eliminate malware including viruses, Trojans, worms, spyware etc.

A device may comprise or represent any device used to communicate with other devices over a wired and/or wireless communication network. Examples of devices that may be used in certain embodiments of the invention, but are not limited to, are wired or wireless devices such as, by way of example only, client devices like computers, mobile telephones, terminals, smart phones, portable computing devices such as lap tops, handheld devices, tablets, net-books, personal digital assistants, and/or server devices such as web servers, databases, servers, proxy servers, and other network devices, entities, or nodes such as base stations, gateways, routers, access points or other devices that are connected to a wired/and/or wireless communication network and used for communication.

A man-in-the-middle (MITM) attack is a form of eavesdropping in which an "attacker" makes independent connections with a user's device and acts as a relay between the device and a trustworthy entity, such as a wireless access point or even another device over a communication network. The attacker can then control or eavesdrop on the user's communication session over the communication network. In these attacks, the attacker may intercept some of the messages into and out of the device, and can inject new false messages into the communication session. This can be particularly straightforward when the attacker is within the reception range of an unencrypted wireless access point.

On an infected device, malware may download malicious software or files that may be used to implement a MITM attack. Configuration files on a device may be modified by malware thereby changing the configuration of the device and thus the behaviour of the device. For example, malware may be used to redirect a user's traffic or packets to a malicious proxy server or other destination allowing an attacker to control or eavesdrop on the user's communication session. An example configuration file that may be tampered with is a proxy auto-config (PAC) file, which defines how web browsers and other user agents on devices can automatically choose the appropriate proxy server (or access method) for fetching a given Uniform Resource Locator (URL).

Recently, MITM attacks have been detected making use of the vulnerabilities of PAC files used by many web browsers on client devices. FIG. 1 illustrates an example of such an attack in communications system 100, which includes a communications network 101 (e.g. the Internet), a device 102, an unauthorised destination device 103 such as a malware domain or an unauthorised proxy server, and a destination device 104 such as a web server. In this scenario, it is assumed that device 102 is infected with malware. Malware on the infected device 102 may download a malicious PAC file to the device. This allows hackers or an attacker to control the PAC file used by web browsers on the device 102. When the device 102 connects to the communications network 101, the web browser then unwittingly uses the malicious PAC file to choose a proxy server such as unauthorised destination device 103 based on the URL rules configured in the PAC file. This means selected web traffic (e.g. bank web traffic) generated by the browser on the device 102 can be redirected to a malicious proxy server or unauthorised destination device 103, which allows the attacker to eavesdrop or manipulate the user's web browser communication session between device 102 and destination device 104. For example, if the destination device 104 is a banking website or webserver, then when the user of device 102 tries to open the banking website, the browser, using a malicious PAC file, may instead connect to the malicious proxy server 103 with all user traffic being routed through the malicious proxy server 103 to the destination device 104 that includes the banking website.

This type of attack is known as a proxy configuration attack. Malicious PAC files are used to redirect/direct or route user traffic or packets to a proxy server that is under the control of hackers or attackers so they get MITM capability on user traffic or packets. Once a device is infected with malware and/or a malicious PAC file, this means the attacker is capable of performing MITM attacks on web sessions in which critical and/or personal data is transmitted such as bank website sessions, online shopping website sessions or any other web session that uses critical or personal data such as passwords, bank details, credit card details, etc. This approach also works against simple host file modifications, Destination Name Server poisoning attacks and other MITM attacks where the host or device is trying to send packet traffic to another host or device and ends up sending the packet traffic somewhere else. However, preventing PAC files from compromising browsers is not a simple task, as client-side and/or server-side security software may not be able to detect whether a change to a given PAC file is actually a valid change or a malicious attack.

There is a desire for efficiently detecting and identifying user traffic or packets generated by devices being redirected based on malicious or unauthorised destinations and preventing redirection of the packets.

SUMMARY

It is an object of the present invention to detect and prevent packets generated by devices during a communication session and transmitted over a communications network from being redirected via unauthorised destination devices to an originally intended destination.

According to a first aspect of the present invention there is provided a method of detecting and preventing unauthorised redirection of packets transmitted in a communication network. The method includes intercepting a plurality of packets generated by one or more devices intended to be directed via one or more authorised destinations towards an original destination and inspecting the intercepted packets and detecting whether at least one of the intercepted packets is being redirected based on an unauthorised destination which is not one of the authorised destinations. Those detected intercepted packets associated with redirection based on the unauthorised destination are then blocked or corrected.

This provides the advantage of detecting and blocking packets being redirected based on an unauthorised destination prevents packets from reaching such unauthorised destinations, allows detection and removal of malware on the source device (e.g. the device generating the packets). In addition, there further advantages in the packets being corrected/modified from being redirected to unauthorised destinations, such as preventing or disrupting the redirection of such packets to unauthorised destinations, while maintaining the communications session e.g. the packets could be corrected to be redirected to authorised destinations.

As an option, inspecting and detecting further includes using packet and protocol inspection on each intercepted packet to determine the originally intended destination of each packet and to determine any other destination(s) associated with redirection of the packet. Additionally, for each intercepted packet, if the any other destination(s) are not associated with one or more authorised destinations corresponding to the originally intended destination, then said each intercepted packet is determined to be associated with redirection to an unauthorised destination.

This provides the advantage of minimising unauthorised access to packets by only allowing packets to be sent through a communication network when the packet is associated redirection or routing towards an authorised destination. This also provides the advantage of reducing the complexity of maintaining knowledge of by, instead, maintaining knowledge of authorised destinations and protecting those packets destined for authorised destinations (e.g. bank website/servers, shopping websites/servers, email websites/serves etc.) This ensures critical data in communications sessions with authorised destinations are protected against unauthorised access.

Optionally, the step of inspecting and detecting further includes, for each intercepted packet, inspecting the intercepted packet to determine the originally intended destination of the intercepted packet and inspecting the intercepted packet (e.g. the header(s)) to determine at set of other destinations, where the set of other destinations include any other destination(s) associated with the intercepted packet excluding the originally intended destination. Determining whether at least one destination in the set of other destinations is associated with the unauthorised destination. Determining that the intercepted packet is associated with redirection based on an unauthorised destination when said at least one destination in the set of other destination(s) is not associated with one or more authorised destination(s) of a set of authorised destinations corresponding to the originally intended destination.

As an option, the step of determining whether said at least one destination in the set of other destinations is associated with an unauthorised destination further includes determining address(es) of the set of authorised destinations associated with the originally intended destination, and comparing the address(es) of the set of authorised destinations with address(es) of said set of other destinations. If the set of authorised destination addresses are not associated with the address(es) of said set of other destinations, then it is determined that at least one destination of the set of other destinations is associated with an unauthorised destination.

Optionally, comparing the set of authorised destination addresses further includes determining whether all addresses of the set of other destinations map onto one or more authorised destination address(es) of the set of authorised destination addresses. If at least one address of the set of other destinations does not map onto one or more authorised destination address(es) of the set of authorised destination addresses, then it is determined that at least one destination of the set of other destinations is associated with an unauthorised destination. Alternatively or additionally, comparing the set of authorised destination addresses further includes, for each address of the set of other destinations, determining whether said each address matches one or more authorised destination address(es) of the set of authorised destination addresses, where it is determined that at least one destination of the set of other destinations is associated with an unauthorised destination when said each address does not match said one or more authorised destination address(es).

As an option, comparing the set of authorised destination addresses further includes, for each address of the set of other destinations, determining whether said each address at least partially matches one or more authorised destination address(es) of the set of authorised destination addresses, where it is determined that at least one destination of the set of other destinations is associated with an unauthorised destination when said each address does not at least partially match said one or more authorised destination address(es).

As an option, determining a set of authorised destination addresses comprises generating said set of authorised destination addresses from data derived from destination name server (DNS) responses associated with the originally intended destination, for example, the DNS server is a trusted DNS.

As an option, the method includes checking that the originally intended destination of the intercepted packet is associated with a list of authorised destinations, where if the originally intended destination of the intercepted packet is not associated with an authorised destination, then sending the intercepted packet to its destination. Optionally, a name server may be configured to include the list of authorised destinations.

Optionally, the method may further include maintaining a database of authorised destinations, where each authorised destination record in the database includes a list of authorised destination addresses. As an option, maintaining the database of authorised destinations further includes, for each authorised domain record, updating the list of authorised destination addresses using destination addresses based on resolving the authorised destination in one or more geographical regions. Additionally or alternatively, maintaining the database of authorised destinations further includes, for each authorised destination record, retrieving the destination name and address pairs from intercepted packets associated with an authorised destination record, and updating the list of authorised destination addresses with a destination name and address pair when packets with the same destination name and address pair have been intercepted from more than two different devices.

As an option, maintaining the database of authorised destinations further includes, for each authorised destination record, generating a set of one or more authorised destination addresses from data derived from destination name server responses associated with the authorised destination, where the destination name servers are trusted destination name server, and updating the list of authorised destination name addresses with the set of one or more authorised destination addresses.

As an option, the destinations include addresses based on Internet Protocol addresses. Optionally, the step of intercepting further includes intercepting packets associated with one or more specific types of packets. For example, the packets may be associated with the Hypertext Transfer Protocol (HTTP), where the packets are associated with HTTP request packets such that the originally intended destination includes the universal resource locator (URL) or universal resource identifier (URI) derived from the HTTP request (e.g. the header of the HTTP request), and the other destination(s) include the hostname(s) and domain(s) or other destination address(es) derived from the HTTP request (e.g. the header of the HTTP request).

As another option, the destination is an unauthorised destination when it is determined that the destination should not be used for redirecting said at least one intercepted packet. For example, an unauthorised destination may include a malicious destination from a list of malicious destinations. As an option, said other destination(s) may include one or more proxy connection(s) that the intercepted packet will traverse before reaching the originally intended destination. Additionally or alternatively, said other destination(s) may include one or more destination(s) that the intercepted packet will traverse before reaching the originally intended destination. Additionally or alternatively, said other destination(s) may include one or more other destination(s) that have already been traversed by the intercepted packet before being intercepted. As another option, the destination is an unauthorised destination when it is determined that the destination should not be used for redirecting said at least one intercepted packet.

Optionally a packet associated with redirection based on one or more other destination(s) includes a packet that is or will be sent or routed towards one or more other destination(s) in the communications network before reaching the originally intended destination of the packet.

According to second aspect of the invention there is provided an apparatus for use in detecting and preventing unauthorised redirection of packets transmitted in a communication network. The apparatus including a processor, a transmitter, a receiver and a memory, where the processor is coupled to the transmitter, the receiver and the memory. The receiver is configured to intercept a plurality of packets generated by one or more devices and intended to be directed via one or more destinations towards an original destination. The processor is configured to inspect and detect whether at least one of the intercepted packets is being redirected based on an unauthorised destination which is not one of the authorised destinations. The processor and transmitter are configured to block or correct those detected intercepted packets associated with redirection based on the unauthorised destination.

As an option, the processor is further configured to use packet and protocol inspection to determine the originally intended destination of the packet and to determine any other destination(s) associated with redirection of the packet, where the processor is configured to, for each intercepted packet, determine said each intercepted packet is associated with redirection to an unauthorised destination when any other destination(s) are not associated with one or more authorised destinations corresponding to the originally intended destination.

Optionally, the processor is configured, for each intercepted packet, to inspect the intercepted packet to determine the originally intended destination of the intercepted packet, inspect the intercepted packet (e.g. the header(s)) to determine a set of other destinations, where the set of other destinations comprise any other destination(s) associated with the intercepted packet excluding the originally intended destination. Determine whether at least one destination in the set of other destinations is associated with an unauthorised destination. Determine that the intercepted packet is associated with redirection based on the unauthorised destination when said at least one destination in the set of other destinations is associated with the unauthorised destination.

As another option, the processor is configured, for each intercepted packet, to determine a set of one or more authorised destination addresses associated with the originally intended destination of the intercepted packet, compare the set of one or more authorised destination address(es) with address(es) of the set of other destinations, and determine that at least one destination of the set of other destinations is associated with an unauthorised destination when the set of authorised destination addresses are not associated with the address(es) of the set of other destinations.

As an option, the processor is further configured, when comparing, to determine whether all addresses of the set of other destinations map onto one or more authorised destination address(es) of the set of authorised destination addresses, and determine that at least one destination of the set of other destinations is associated with an unauthorised destination when at least one address of the set of other destinations does not map onto one or more authorised destination address(es) of the set of authorised destination addresses. As a further option, the processor may be configured to maintain a database of authorised destinations, wherein each authorised destination record in the database includes a list of authorised destination addresses.

Optionally, the apparatus may be part of a client device, a server or gateway in the communications network, or any other device within the communications network that is in a position/location for receiving data traffic/packets from devices.

Further aspects of the invention provide methods, apparatus, and computer program(s) comprising program instructions, which when executed on a processor, perform the methods described herein as set forth in the appended claims, and also computer readable medium(s) including such computer program(s). Further features of the invention are outlined in the description below and in the appended claims. Preferred features are set out in the dependent claims.

BRIEF DESCRIPTION OF THE DRAWINGS

Some examples or embodiments of the invention will now be described by way of example only and with reference to the accompanying drawings, in which.

DETAILED DESCRIPTION

Figure 1:
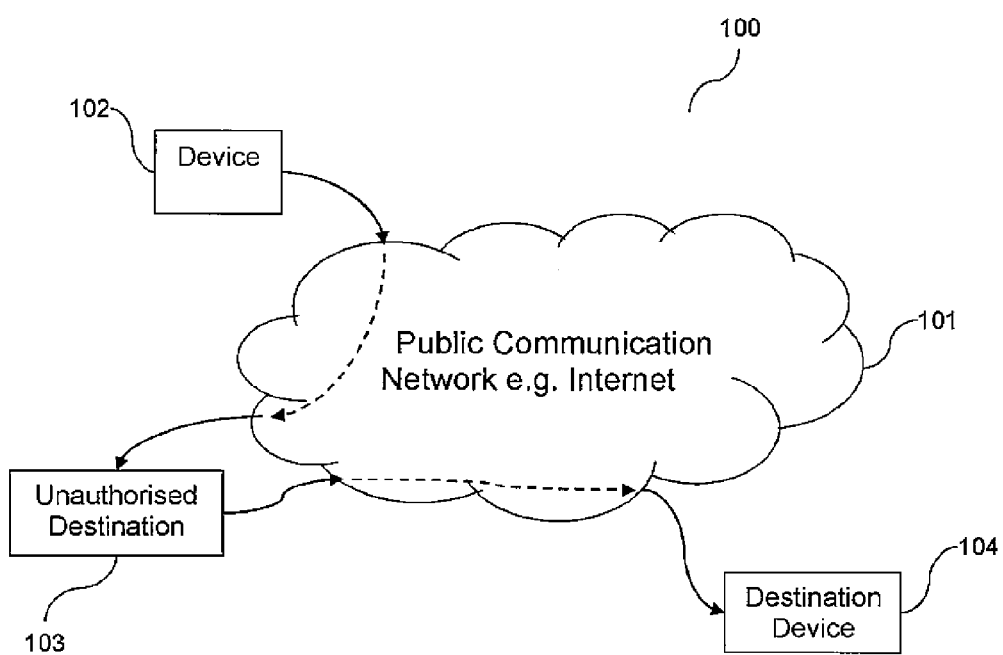
FIG. 1 illustrates schematically a prior art communication system.

As discussed above, present approaches for detecting and preventing unauthorised redirection or routing of packets generated by one or more devices and transmitted over a communication network is complex to implement and/or difficult to detect, which makes it very difficult to prevent unauthorised redirection or routing of said packets.

Typically, the transmission of data over a communications network is achieved as a sequence of small data chunks or suitable sized data blocks called packets. Each packet is passed through the network from a source (e.g. the device generating the packet such as a client device or other network entity) to an originally intended destination (e.g. another client device or another network entity) via one or more other destinations such as other devices, network entities or nodes. Each packet typically includes a data payload, which is a small chunk of the data being transmitted, and one or more packet header(s), which typically provides information such as the originally intended destination, other destinations the packet is to be sent to, and/or source address, and the type of packet or communications protocols being used etc.

It is proposed herein that these problems can be addressed by a mechanism such as method(s), process(es) and/or apparatus as described herein that can detect and prevent unauthorised redirection or routing of packets transmitted in a communication network. In essence, packets are transmitted by one or more devices in the communications network, where during a communication session between a first device and a second device each packet is sent from the first device to the originally intended destination of the second device (e.g. an HTTP request is sent from a user device to a webserver that is associated with a uniform resource locator (URL), which is the originally intended destination). During transit, the packets are intercepted and monitored to determine the originally intended destination each packet is attempting to reach, and to determine the other destination(s) and/or other connection(s) (e.g. IP address(es)) the packet has been to and/or is being sent to prior to reaching its originally intended destination.

The term redirection is used to describe the directing of a packet to one or more other destination(s) when the packet is sent over a communications network to the originally intended destination of the packet. For example, a packet may be sent, directed or routed towards one or more other destination(s) in the communications network before reaching the originally intended destination of the packet. That is the packet is redirected or routed via the one or more other destination(s) to the originally intended destination of the packet. Alternatively, the packet may be redirected or routed to the one or more other destination(s) instead of the originally intended destination. Although the term redirection is used herein, it is to be appreciated by the person skilled in the art that other terms may be used such as routing or forwarding and where applicable, these terms may be used interchangeably with that of redirection.

As described herein a destination may comprise or represent any location, device, identity of a device or connection (e.g. an IP address) that a data packet may pass through, be redirected or routed to, or visit as it traverses a communications network after being transmitted by the device generating the packet towards the final destination device, the originally intended destination of the packet. A data packet is typically redirected or routed from one device (e.g. node, router, server or gateway) to another device through the communications network because the device generating and transmitting the packet (e.g. the source device) and the originally intended destination of the packet (e.g. the final destination device) are not directly connected. Each device that receives the packet and forwards the packet onwards in the communication network to the originally intended destination is also considered to be one of the destination(s) (or connection(s)) of the packet.

If the other destination(s) such as the other connection(s) or IP address(es) are not associated with one or more authorised destination(s) corresponding to the packet's originally intended destination, i.e. this means the packet may have been or is being redirected or routed to an unauthorised destination, then the packet is blocked from being transmitted to the originally intended destination. The packets detected to be associated with redirection to an unauthorised destination, e.g. unauthorised proxy connection(s) or IP address(es), are blocked. This mechanism provides the advantage of disrupting the transmission of packets that may be in danger of malicious alteration thus minimising or preventing a communications session between two devices (e.g. client/server devices in a web session) from being maliciously interfered with. Alternatively or additionally, the packets detected to be associated with redirection to an unauthorised destination, e.g. unauthorised proxy connection(s) or IP address(es), may be modified or corrected such that those packets are redirected/routed to authorised destinations. This provides the advantage that packets are prevented from being redirected to unauthorised destinations, but the communications session is also kept alive as the packets are treated accordingly and reach the originally intended destination via authorised destinations.

In particular, a plurality of packets generated by one or more device(s) are intercepted, and packet inspection and detection is performed on these packets to determine whether at least one of the intercepted packets is associated with redirection/routing based on an unauthorised destination. Redirection/routing to the unauthorised destination is prevented by blocking those detected intercepted packets that are associated with redirection based on the unauthorised destination.

For example, packet inspection may comprise or represent the analysis of packets at different levels, from analysing the IP header(s) for IP address(es) used during transit of the packet, or analysing the application header(s) for URLs and other information representing the originally intended destination of the packet. Various packet inspection algorithms may be used such as IP header inspection, shallow inspection through to Deep Packet Inspection and heuristic detection. The packet inspection determines from the packet header(s) the IP address(es) associated with other destinations the packet may and/or is to traverse; these are compared with the IP address(es) of authorised destinations of where the packet should traverse to reach the originally intended destination of the packet. It is assumed the originally intended destination is associated with an authorised destination. Should the other destinations not be associated with any of the IP address(es) of authorised destinations, then the packet is considered to be associated with redirection to an unauthorised destination.

The unauthorised destination may be a malicious destination, or any other destination that should not, as determined by the mechanism, method or apparatus, be used for redirection or routing of said at least one intercepted packet. For example, an unauthorised destination for redirecting or routing at least one intercepted packet prior to the packet reaching its originally intended destination. Examples of unauthorised destinations include unauthorised devices such as unauthorised proxy servers, malicious forwarding proxy server(s) or other malicious or malware destination(s) or proxy server(s) that enables an attacker to interfere with or eavesdrop on the communications session associated with the intercepted packet (e.g. an attacker may use a proxy server to piggyback on packets associated with a web-banking communication session to retrieve login details of the customer and thus gain access to the customer's bank account).

Authorised destination(s) may include or represent any destination or destination device that may be authorised for transmitting/receiving packets. For example, authorised destinations may include, but are not limited to, destinations and destination devices that have been authorised by a trusted party or determined to be authorised for communicating packets (e.g. trusted destination devices such as trusted proxy servers, routers, gateway devices, and devices of internet service provider networks), or other authorised destinations such as an authorised originally intended destinations such as, by way of example, online banking destinations, online shopping destinations, internet chat destinations, webmail destinations, large corporate websites and destinations, and even trusted personal destinations, other trusted devices, or any other destination or device that is associated with good reputation and/or does not interfere with sensitive information in a packet.

For example, a browser on a user device may use the Hypertext Transfer Protocol (HTTP) and sends packets in the form of HTTP request messages when connecting to websites or web servers. These packets can be monitored to determine the URLs (e.g. the originally intended destination devices) to which the user is trying to navigate to and to which IP address their browser actually ends up making connections to prior to the HTTP request messages reaching the originally intended destination. If the connections are not associated with the domain or destination associated with the URLs, then it is likely the HTTP request messages are being redirected to an unauthorised destination (e.g. a malicious proxy server or malware destination) and interfered with before being received by the originally intended destination device, in which case the HTTP request messages may be blocked to prevent further interference or treatment by a potentially unauthorised destination device prior to the HTTP request messages reaching their originally intended destination.

The mechanism may be used in any apparatus or device within a communication network. For example, a user client device may be configured to detect and prevent malicious redirection of a plurality of packets via an unauthorised destination device that are being transmitted by the user client device to an originally intended destination device during a communication session. In this way, the client device is secured against malicious redirection of packets, even if the client device is infected with malware. In fact, the mechanism of the present invention may be used to detect whether the client device is infected with malware because the mechanism could notify the client device that packets are being blocked because they are being maliciously redirected. This could be used to prompt the user or trigger a malware scanner to perform a malware scan on the client device to detect and remove the malware or hack that is causing the client device to redirect packets to via an unauthorised destination device.

Alternatively, a server or gateway device may be configured to detect and prevent malicious redirection of a plurality of packets being transmitted by one or more devices in a communications network. Similarly, this secures the user devices that transmit packets through the server or gateway device as intercepted packets that are detected as being associated with unauthorised or malicious redirection may be blocked. In addition, as previously described, the server or gateway device may notify the user devices of potential infection with malware when packets from those devices are found to be blocked due to redirection to or via an unauthorised destination.

Although HTTP request packets have been used in the examples and embodiments as outlined herein, it is to be appreciated by the skilled person that HTTP request packets have been used for simplicity and, by way of example only, and the process and apparatus as described herein may be used to handle any type of communications protocol or packets such that addressing information associated with the originally intended destination and the other destinations may be determined through packet inspection and compared against authorised addressing information for determining whether the packets are associated with redirection based on an unauthorised destination.

Figure 2:
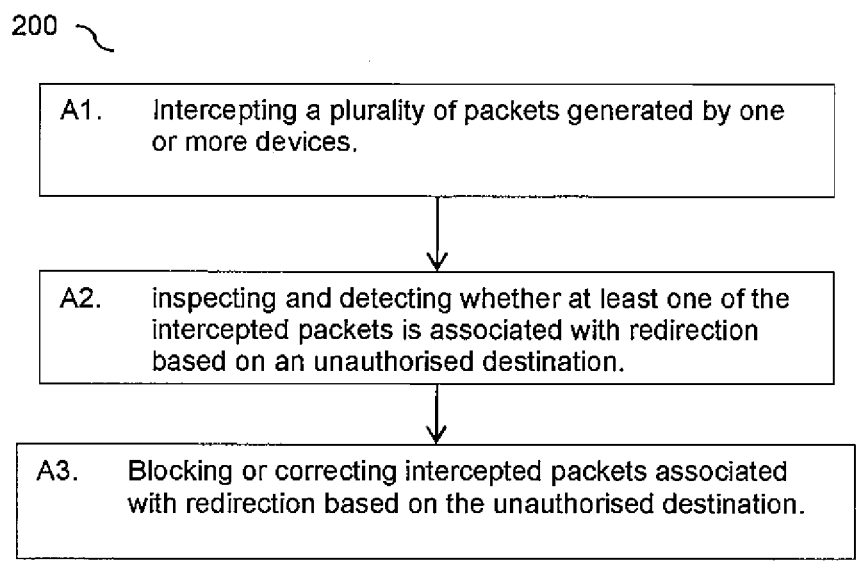
FIG. 2 is a flow diagram illustrating an example process according to an embodiment of the invention.

FIG. 2 is a flow diagram illustrating an example process 200 according to the invention. The process 200 may be performed by any device in a communications network that is communicating with any other device in the communications network. The communications network includes a plurality of devices in communication with each other and transmitting a plurality of packets over the communication network. For example, a device of the plurality of devices may be in communication with a destination device and when the device transmits one or more packets to the destination device, the device includes in each packet data representative of the originally intended destination associated with the destination device.

The process 200 detects and prevents unauthorised or malicious redirection of the plurality of packets in the communication network. The process includes the following steps:

A1. Intercepting the plurality of packets generated by said one or more devices. Each packet includes data representative of the originally intended destination device that the corresponding device transmits the packet towards.

A2. Inspecting and detecting whether at least one of the intercepted packets is associated with redirection based on an unauthorised destination.

A3. Blocking or correcting those intercepted packets that are detected to be associated with redirection based on the unauthorised destination.

By way of example only, a user device may generate many HTTP request message packets during a web browsing session. These packets may be intercepted and monitored to determine the packet's destination, or the originally intended or final destination, based on the URL of the HTTP request. The intercepted packets may be inspected using packet and protocol inspection to determine the originally intended destination or final destination that the packets should be sent to. The header(s) of the HTTP request packet (e.g. HTTP headers, IP headers etc.) are also read to determine whether the HTTP request packet is being connected to the originally intended destination via one or more other destination(s) such as one or more proxy connection(s). A comparison is performed on the IP address(es) of the destination associated with the URL to which user is trying to navigate to and on the IP address(es) of the any other destination(s) or proxy connection(s) that their browser actually ends up making connections to. The basic idea is to intercept HTTP request messages/query packets while in transit, read from headers where the query is supposed to go and see from IP header where it actually is going to before reaching the originally intended destination. If, after it is determined where the packet is supposed to be going, it is determined the packet is going to the original intended destination via an unauthorised destination, then the packet is blocked.

For example, a set of authorised destinations of where each packet is supposed to go that is associated with the originally intended destination is determined. If the other destination(s) or proxy connections(s) are associated with the set of authorised destination(s), then the packet is said to be associated with redirection or routing based on an authorised destination, otherwise the packet is associated with redirection based on an unauthorised destination and may be blocked.

Additionally or alternatively, if a set of authorised destinations of where each packet is supposed to go that is associated with each originally intended destination is determined, then the intercepted packets that are determined to be redirected to unauthorised domains may be modified or corrected and sent towards the originally intended destination via authorised destinations. This provides the advantage that both the redirection based on unauthorised destinations is disrupted, but also the communications session may be maintained.

If intercepted packets are determined to be redirected based on unauthorised destinations, then the device that generated the packet may be notified that it may be infected with malware, which may prompt the user or antivirus/malware software to detect and remove the malware or cause of the redirection based on unauthorised destinations.

Figure 3:
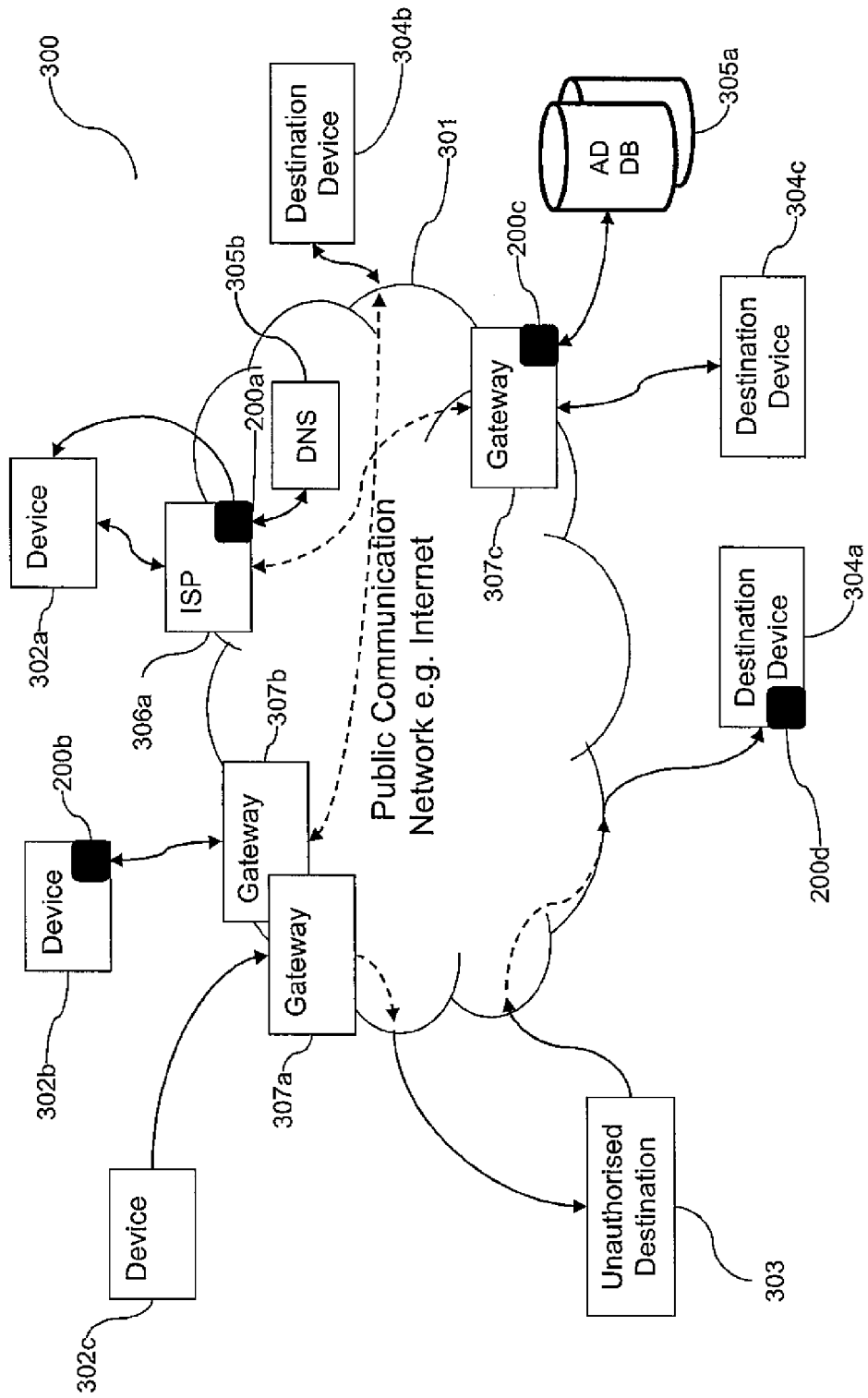
FIG. 3 illustrates schematically a communication system including the example apparatus of FIGS. 2*a* and 4*a*-5 according to the invention.

FIG. 3 is a schematic illustration of a communication system 300 including a public communication network 301 (e.g. the Internet) with a plurality of devices 302a-302c and 304a-304c in communication with each other via the communication network 301.

The plurality of devices 302a-304c includes a plurality of client devices 302a-302c and a plurality of destination devices 304a-304c. In the communication network 301 there is an unauthorised destination device 303, which may be a malware destination or unauthorised proxy server or other unauthorised, unknown or untrusted destination. The plurality of devices 302a-304c communicate with each other via a plurality of network devices such as Internet Service Provider (ISP) 306a, gateway devices 307a-307c in the communication network 300. Some of the devices 302b, 306a, 307c and 304a are shown to be configured to perform or include an apparatus 200a-200d that performs a process according to the invention for detecting and preventing unauthorised or malicious redirection of packets in the communication network 301 via an unauthorised destination device 303 before the packets reach the originally intended destinations or destination devices 304a-304c. The communication system 301 also includes at least one destination name server 305b and/or a database of authorised destinations 305a, which includes a record for each authorised destination including a list of authorised destination IP addresses associated with the authorised destination.

In operation, if device 302a is infected with malware, the malware may reconfigure device 302a to send packets via ISP 306a to unauthorised destination device 303. For example, an application such as a web browser on device 302a may have a malicious proxy configuration installed, which redirects packet traffic, intended for authorised destinations or any originally intended destination device that the device 302a wishes to communicate with such as, by way of example only, banking websites, online shopping websites, or corporate websites and VPNs, that attackers are interested in to their proxy server such as unauthorised destination 303.

In this example, when the user attempts to browse a webpage associated with destination device 304c (e.g. www.bank.com web page), destination device 304c becomes the originally intended destination that the corresponding HTTP request packet(s) will be transmitted to. However, the malware on device 302a causes the browser to obey the malicious proxy configuration and, instead of resolving the destination name and address of the originally intended destination to be that of device 304c, ends up sending the HTTP request packet(s) to the originally intended destination via the unauthorised destination device 303 for a MITM attack. Although HTTP request packet(s) are used in this example, it is to be appreciated by the person skilled in the art HTTP request packet(s) are used, by way of example only, and that the invention as defined by the process/apparatus 200a-200d may be configured to handle any type of packet as long as the destination IP address and any proxy connection IP address(es) or other IP address information indicating the original intended destination of where the packet is going can be determined from the packet or from the packet header(s). Packet and protocol inspection may be used to inspect the packet to determine the relevant destination information e.g. URLs, IP address information or other addressing information.

Fortunately for device 302a, ISP 306a is configured to perform a process or include an apparatus 200a according to the invention. The process or apparatus 200a intercepts the HTTP request packet(s) transmitted from device 302a and inspects or reads the hostname and destination from HTTP header(s) of the HTTP request packet(s) (e.g. read the Host field in HTTP header) to determine whether these correspond to a proxy connection or an unauthorised destination device. HTTP header fields are components of the message header of requests and responses in the HTTP. They define the operating parameters of an HTTP transaction or communication session.

The ISP 306a may have access to a trusted destination name server (DNS) (e.g. DNS 305b), or a network resolution service (NRS) or one or more databases of authorised destinations 305a (e.g. via gateway 306c), from which the process or apparatus 200a may retrieve IP address information associated with the URL of the originally intended destination indicating that the originally intended destination may be associated with one or more authorised destination device(s) (e.g. authorised proxy devices, authorised connections, or the authorised server(s) of critical websites like banking or corporate websites or other authorised user critical websites). The process 200a also determines the possible authorised destination(s) or connection(s) that the originally intended destination of each packet should resolve to. As well, process 200a also determines any other destination(s) such as proxy connection(s) (e.g. host.destination.tld) that the HTTP request packet(s) may be associated with and determines the corresponding destination IP addresses that the other destination(s) or proxy connection(s) should resolve to.

After this, the process or apparatus 200a compares the destination IP address(es) associated with the other destination(s) or proxy connection(s) with the possible set of authorised IP address(es) associated with the possible authorised destinations. If all the other destination or proxy IP address(es) do not produce a match with any of the possible set of authorised IP addresses associated with the originally intended destination device 304c, then it is determined that the HTTP request packet(s) is associated with redirection based on an unauthorised destination or destination device (e.g. unauthorised destination device 303 or a malware destination) before the packet(s) reach the originally intended destination of device 304c.

In response, process or apparatus 200a triggers ISP 306a to block the HTTP request packet(s) being sent from device 302a. This prevents the HTTP request packet(s) from reaching unauthorised destination device 303, and therefore prevents the MITM attack. Alternatively, ISP 306a could be configured to modify the other destination(s) information such as the other destination(s) IP address(es) within the packet(s) such that the packet(s) are correctly transmitted through the communication network 300 to the originally intended destination device 304c via authorised destination devices (e.g. via gateway device 307c to destination device 304c).

Process or apparatus 200a may notify device 302a that it may be infected with malware to prompt the user or antivirus/malware software to detect and remove the malware. If device 302a was not infected with malware then the result of the comparison may be that all the other destination IP address(es) such as proxy destination IP address(es) do produce a match with any of the possible set of authorised IP addresses for originally intended destination device 304c. In this case, it would be determined that the HTTP request packet(s) are not associated with redirection based on an unauthorised destination or device 303, and so the packet(s) are forwarded to the originally intended destination device 304c.

It can be seen that present invention may be implemented in a process or apparatus 200b in device 302b, which is a client device. If device 302b were infected with malware in a similar fashion as device 302a, then the process or apparatus 200b may perform similar operations, but only operate on packet(s) generated by device 302b, and block the packet(s) that are detected as being redirected to the unauthorised destination device 303. Alternatively, apparatus 200b could be configured to modify the other destination(s) IP address(es) within the packet(s) such that the packet(s) are correctly transmitted to the originally intended destination device via authorised destination devices (e.g. via gateway device 307b to destination device 304b). Again, process or apparatus 200b may notify the user or antivirus/malware software on device 302b of the malware infection and prompt it to remove the infection. Once removed, the packet(s) should not be redirected to the unauthorised destination device 303, and so process or apparatus 200b will allow the packet(s) to be forwarded via gateway 307b onto the destination device 304b, which may be a webserver or even a web email server etc.

Alternatively, the invention may be implemented as a process or apparatus 200c in gateway 306c, in which case it may detect and prevent malicious redirection/routing of, by way of example only, HTTP response packet(s) from destination device 304c destined for any of the devices 302a-302c. The process or apparatus 200c will operate in a similar fashion as already described, but instead of using a URL to define the originally intended destination device, the destination address may be derived from the IP header and the other destination(s) such as proxy connections might be derived from the location header field.

Further a destination device 304a may include a process/apparatus 200d according the invention. In operation, when device 302c is infected with malware, the malware may reconfigure device 302c to send some packets via gateway 307a to unauthorised destination device 303 as previously described. When the user attempts to browse a webpage associated with an authorised destination device such as destination device 304a (e.g. a www.bank.com webpage), the browser obeys the malicious proxy configuration and instead of resolving the originally intended destination to be destination device 304a the browser ends up sending the HTTP request packet(s) to the unauthorised destination device 303 via gateway 307a for a MITM attack, after which the unauthorised destination device 303 sends the maliciously interfered HTTP request packet(s) on towards the originally intended destination device 304a of the original HTTP request packet(s).

Fortunately for device 302c, destination device 304a is configured to perform a process or include an apparatus 200d according to the invention. The process or apparatus 200d intercepts the HTTP request packet(s) transmitted from unauthorised destination device 303 and inspects or reads the hostname and destination from HTTP or IP header(s) of the HTTP request packet(s) (e.g. read the Host field in HTTP header), and/or the other destination information associated with where the packet may have come from (e.g. the proxy connections field(s)). The destination device 304a may have access to a trusted DNS 305b, or a NRS or one or more databases of authorised destinations 305a, from which the process or apparatus 200d may retrieve information indicating that the destination device 304a is an authorised destination (e.g. a banking site or other user critical site), for example by checking what IP address(es) the intended URL destination resolves to.

In this case, the process/apparatus 200d may determine the possible authorised destination devices or IP address(es) that the packet(s) it receives are authorised to traverse during its transit to the originally intended destination device 304a. The process/apparatus 200d also checks the host.destination.tld and/or other destination(s) such as proxy connections determined in the HTTP request header and/or IP headers etc. that the HTTP packets may have been redirected from, against known destination IP addresses that these should resolve to. If the other destination IP address(es) such as proxy connection IP address(es) do not match with the possible authorised IP addresses that the packet may have traversed prior to arriving at the intended destination device 304a, then the HTTP request packet is blocked, thus the web browsing session is terminated minimizing any damage the MITM attack may have caused. The destination device 304a may notify device 302c that it is infected with malware, by transmitting the notification towards device 302c avoiding unauthorised device 303.

As shown in FIG. 3, there are several methods to retrieve or resolve destination names and their corresponding IP addresses. It is to be appreciated that many large destination devices 304a-304c such as web servers providing web services do not have a single IP address or globally stable group of IP addresses. This may mean that simple DNS resolving is not enough to check that the destination device or the other destination(s) are an authorised destination such as a bank website, and what the proxy connections such as hostname and destination resolve to. Authorised destinations may have services hosted over a large scale hosting provider and will have different IP addresses for different geographical regions. This means that the destination may resolve to multiple IP addresses depending on location of the device 302a-302c.

In addition to DNS resolving, an authorised destination database or IP address database may be maintained, for example, the above-mentioned one or more database(s) of authorised IP addresses 305a. These databases may include mappings or records of authorised destinations with corresponding IP address(es). The databases may be maintained by resolving the IP address(es) for each destination based on many geographical regions using various datacenters and VPN endpoint providers. This means that no matter in which country a device 302a-302c may be located, then the database(s) should have the correct mappings or records of authorised destination to IP information available. Other approaches may include at each gateway 307a-307c or ISP

306a, or even at each device with a process/apparatus 200a-200d, passively collecting destination/IP pairs from user packet traffic and recording all destination and IP addressing mapping information seen by more than one or two user(s).

Figure 4A:
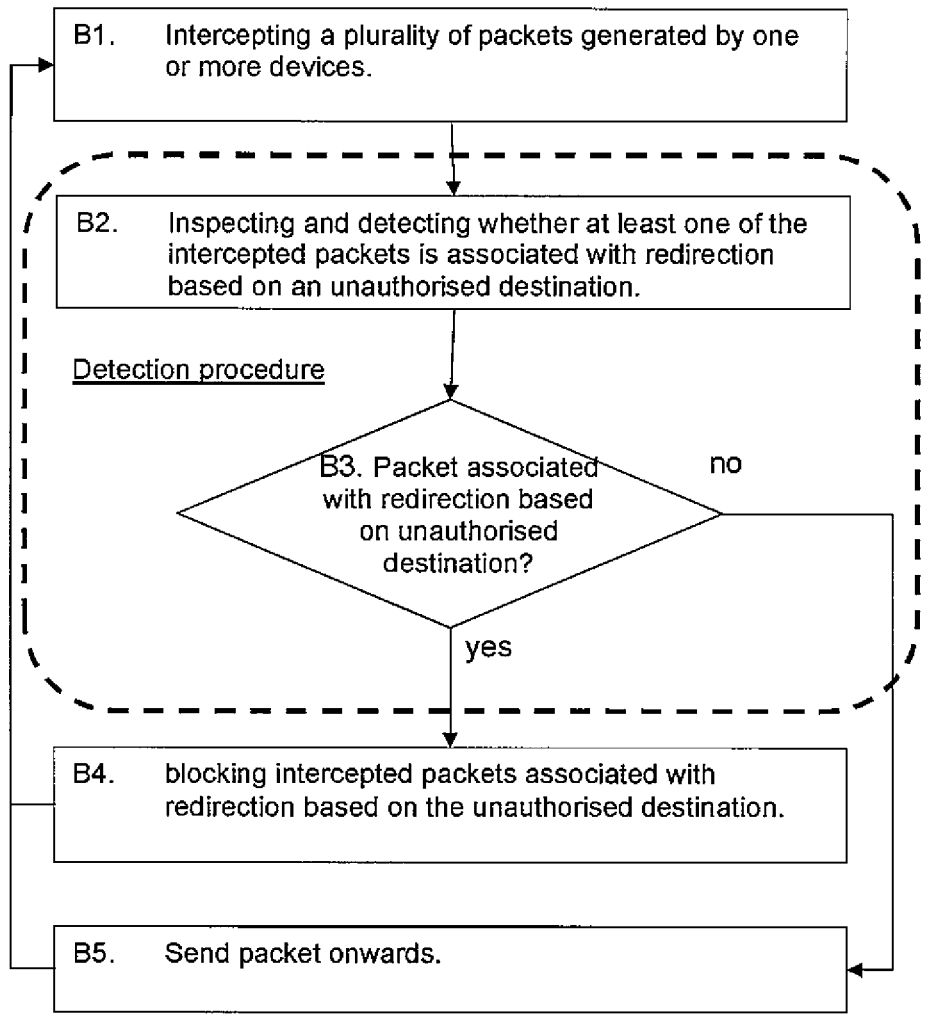
FIG. 4*a* is a flow diagram illustrating an example process according to another embodiment of the invention.

FIG. 4a is another flow diagram illustrating another example process according to the invention for detecting unauthorised redirection of packets transmitted in a communication network. The process includes the following steps of:

B1. Intercepting a plurality of packets generated by one or more devices.

B2. Inspecting and detecting whether at least one of the intercepted packets is associated with redirection based on an unauthorised destination or device. For example, the intercepted packets may be inspected to determine the addressing information they contain is associated with authorised destinations or devices.

B3. Check whether an intercepted packet is associated with redirection from an unauthorised destination. If the intercepted packet is associated with redirection from the unauthorised destination, then proceed to step B4, otherwise proceed to step B5. For example, if some of the addressing information within the intercepted packet is not associated with an authorised destination or device, then the intercepted packet can be associated with redirection based on an unauthorised destination or device.

B4. Block those detected intercepted packets associated with redirection based on the unauthorised destination. Proceed to B1. Alternatively, those detected intercepted packets associated with redirection based on the unauthorised destination may be corrected/modified such that the packet is sent via authorised destinations towards the originally intended destination.

B5. Send the packet onwards towards the originally intended destination. Proceed to B2.

A destination is an unauthorised destination when it is determined by the process that the destination should not be used for redirecting said at least one intercepted packet. An unauthorised destination may include a malicious destination from a list of malicious destinations. As an illustration, it is noted that steps B2 and B3 may comprise a detection procedure for detecting whether the intercepted packet is associated with unauthorised redirection.

Optionally, the process may include checking that the destination of the intercepted packet is associated with a list of authorised destinations, where if the destination of the intercepted packet is not associated with an authorised destination, then sending the intercepted packet to its destination.

Figure 4B:
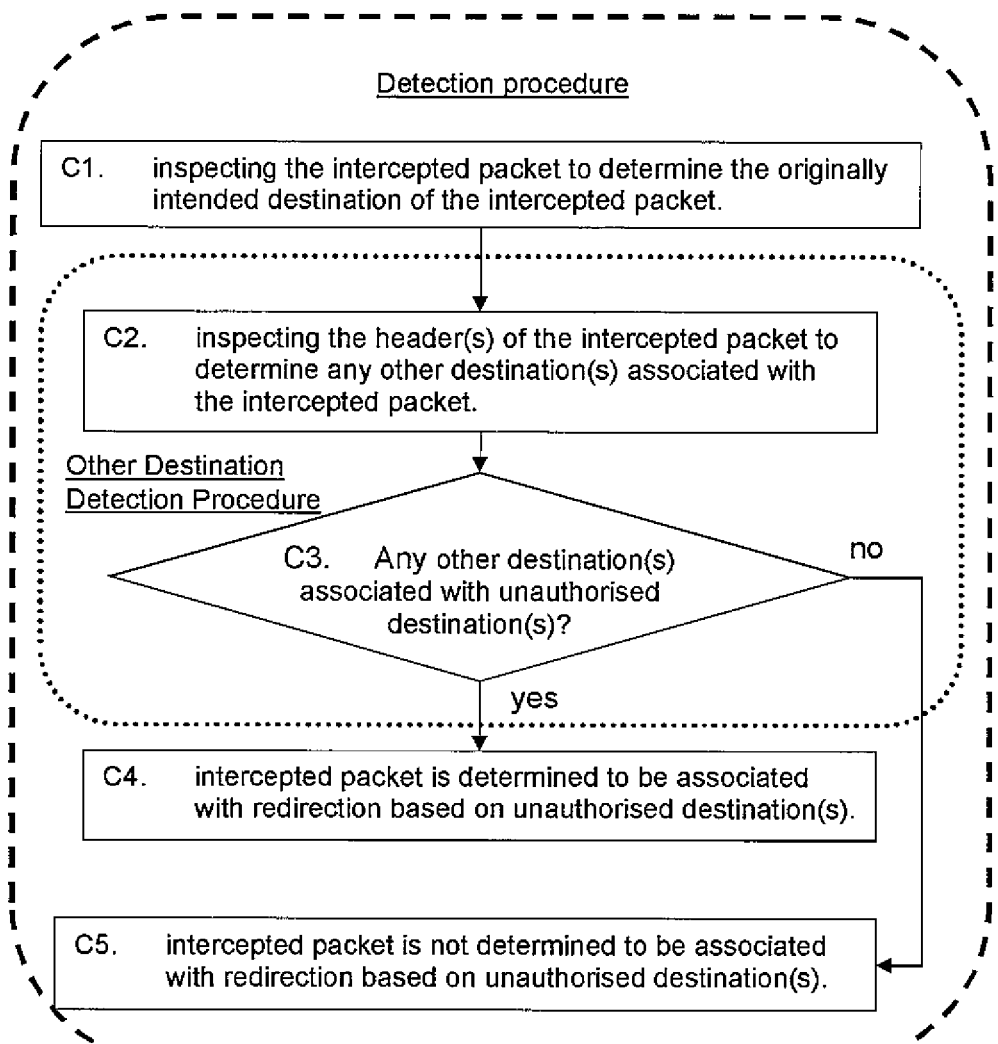
FIG. 4*b* is a flow diagram illustrating an example detection process according to an embodiment of the invention.

FIG. 4b is another flow diagram illustrating an example Detection Procedure process according to the invention for use by step B2 of the process of FIG. 4a for detecting unauthorised redirection of packets transmitted in a communication network. The Detection Procedure process includes the following steps, for each intercepted packet, of:

C1. Inspecting the intercepted packet to determine the originally intended destination of the intercepted packet. For example, the originally intended destination may be a URL if the packet is an HTTP request packet; alternatively, the originally intended destination may be an IP address from the IP header of a packet that identifies the endpoint destination device that the packet is intended to reach. Proceed to C2.

C2. Inspecting the header(s) of the intercepted packet to determine any other destination(s) such as proxy connection(s) associated with the intercepted packet. For example, the hostname and destination field(s) of an HTTP request packet may be assumed to be at least one or more other destination(s) or proxy connection(s) other than the originally intended destination until it is determined otherwise. Proceed to C3.

C3. Checking whether the other destination(s) (e.g. proxy connection(s)) are associated with unauthorised destinations or devices? For example, if some of the addressing information of the other destination(s) within the intercepted packet is not associated with an authorised destination or device, then the other destination(s) may be associated with redirection based on an unauthorised destination or device. If yes, then proceed to C4, if no then proceed to C5.

C4. Indicating to step B3 that the intercepted packet is determined to be associated with redirection based on the unauthorised destination when at least one of the other destination(s) (e.g. proxy connection(s)) is associated with the unauthorised destination.

C5. Indicating to step B3 that the intercepted packet is not determined to be associated with redirection based on the unauthorised destination when all of the other destination(s) (e.g. proxy connection(s)) are associated with one or more authorised destinations or devices.

The other destination(s) (e.g. proxy connection(s)) further include any addressing information or connection(s) the intercepted packet will traverse before reaching the destination. Additionally or alternatively, the other destination(s) (e.g. proxy connection(s)) further include any addressing information or connection(s) the intercepted packet may have traversed before being intercepted. It will be appreciated that these may also include the final destination address or the originally intended destination. As an illustration, steps C2 and C3 are shown to comprise an Other Destination Detection Procedure for detecting/determining whether the addressing information associated with other destination(s) in each packet is associated with unauthorised destination(s) by using authorised destination addressing information.

Figure 4C:
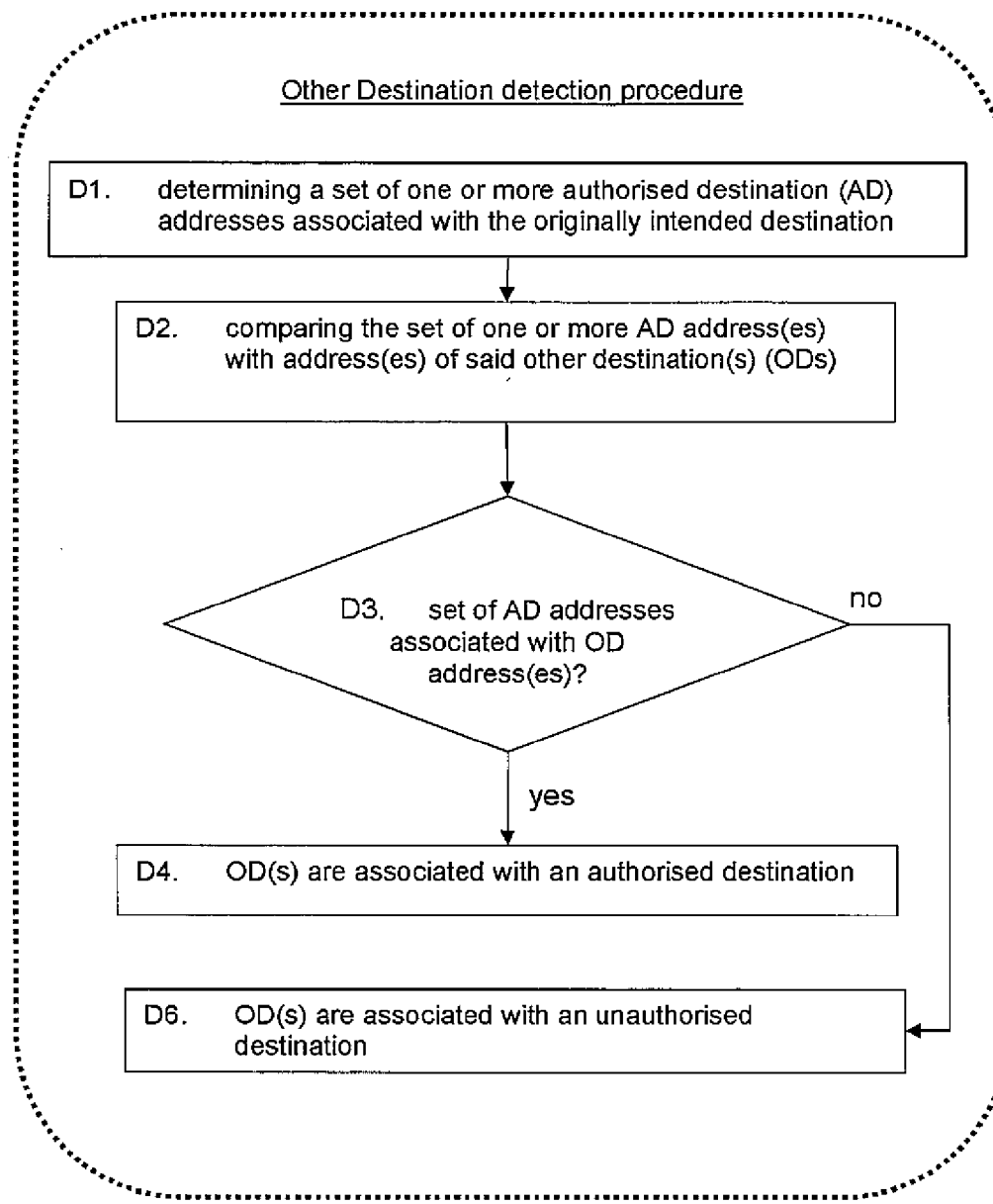
FIG. 4*c* is a flow diagram illustrating an example other destination detection process according to an embodiment of the invention.

FIG. 4c is another flow diagram illustrating an example Other Destination Detection Procedure according to the invention for use by steps C2 and/or C3 of the process of FIG. 4b for detecting whether addressing information associated with other destination(s) (e.g. proxy connection(s)) are based on unauthorised destinations or devices using authorised destination addressing information. The other destination detection procedure includes the following steps, for each intercepted packet, of:

D1. Determining one or more address(es) of a set of one or more authorised destinations associated with the originally intended destination. For example, the authorised destination address(es) may be IP address(es) associated with an authorised destination of the originally intended destination such as a website handling confidential information (e.g. a banking website, corporate server or online shopping webserver), and/or authorised destinations or connections the packet should traverse prior to reaching the originally intended destination (e.g. authorised proxy connections, devices, servers, routers etc.).

D2. Comparing the set of authorised destination address(es) with the address(es) of said other destination(s) (e.g. IP address of a proxy connection(s)).

D3. Check if the set of authorised destination addresses are associated with the other destination address(es) (e.g. proxy connection address(es))? If not, then the set of authorised destination addresses are not associated with the address(es) of said at least one other destination and it is determined that said least one other destination is associated with an unauthorised destination or device. Proceed to D5. Otherwise, if yes, then the set of authorised destination address(es) are associated with the address(es) of the other destination(s) and so the other destination(s) is associated with one or more of the authorised destinations. Proceed to D4.

D4. Indicate to step C3 that the other destination(s) is associated with an authorised destination.

D5. Indicate to step C3 that the other destination(s) is associated with an unauthorised destination.

In step D2, comparing the set of authorised destination addresses may further include determining whether all addresses of the set of other destinations map onto one or more authorised destination address(es) of the set of authorised destination addresses. If at least one address of the set of other destinations does not map onto one or more authorised destination address(es) of the set of authorised destination addresses, then it is determined that at least one destination of the set of other destinations is associated with an unauthorised destination. Alternatively or additionally, comparing the set of authorised destination addresses may further include, for each address of the set of other destinations, determining whether said each address matches one or more authorised destination address(es) of the set of authorised destination addresses, where it is determined that at least one destination of the set of other destinations is associated with an unauthorised destination when said each address does not match said one or more authorised destination address(es).

Alternatively or additionally, comparing the set of authorised destination addresses may further includes, for each address of the set of other destinations, determining whether said each address at least partially matches one or more authorised destination address(es) of the set of authorised destination addresses, where it is determined that at least one destination of the set of other destinations is associated with an unauthorised destination when said each address does not at least partially match said one or more authorised destination address(es). Although this may be a little less secure, it may increase the speed of the comparison, especially when the comparison is performed on multiple IP addresses.

In step D1, determining a set of one or more authorised destination addresses may include generating said set of one or more authorised destination addresses from data derived from destination name server responses associated with the destination. The destination name servers may be trusted destination name servers.

Alternatively or additionally, the processes as described with reference to FIGS. 4a-4c' may include maintaining a database of authorised destinations, where each authorised destination record in the database includes a list of authorised destination addresses. Maintaining the database of authorised destinations further includes, for each authorised destination record, updating the list of authorised destination addresses using destination addresses based on resolving the authorised destination in one or more geographical regions. Maintaining the database of authorised destinations may further include, for each authorised destination record, retrieving the destination name and address pairs from intercepted packets associated with an authorised destination. Updating the list of authorised destination addresses with a destination name and address pair when packets with the same destination name and address pair have been intercepted from more than one or two different devices.

Additionally or alternatively, maintaining the database of authorised destinations further includes, for each authorised destination record, generating a set of one or more authorised destination addresses from data derived from DNS responses associated with the authorised destination. The DNS may be a trusted DNS. Updating the list of authorised destination addresses with the set of one or more authorised destination addresses.

Figure 5:
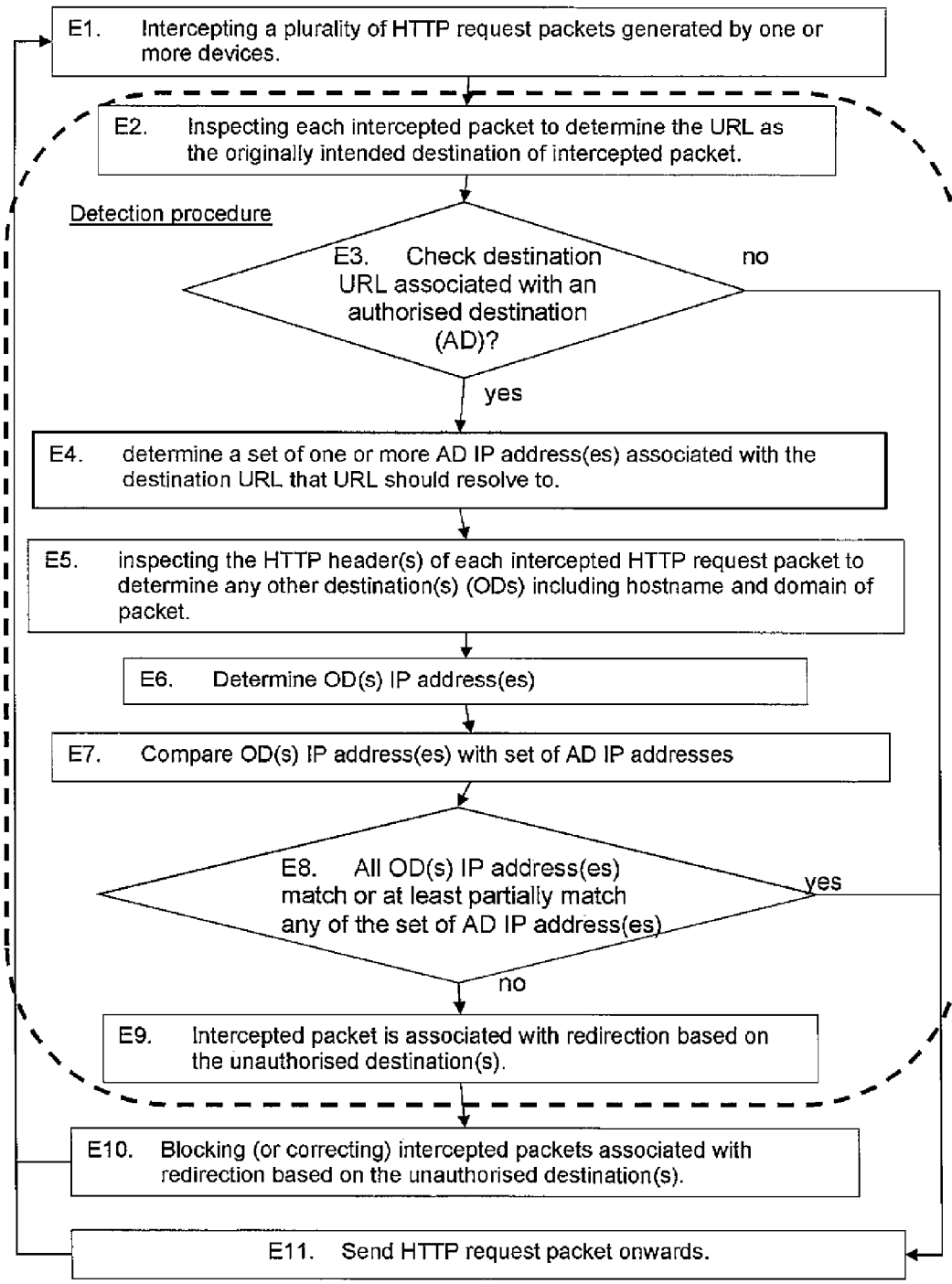
FIG. 5 is a flow diagram illustrating a further process in relation to web browsers according to an embodiment of the invention.

FIG. 5 is another flow diagram illustrating an example process according to the invention for use in detecting and preventing unauthorised redirection of HTTP request packets in a communications network. The process includes the following steps of:

E1. Intercepting a plurality of HTTP request packets generated by one or more devices. Proceed to E2.

E2. Inspecting each intercepted packet to determine the URL of the intercepted packet, the URL of the intercepted packet is the originally intended destination of the packet.

E3. Check URL destination corresponds to an authorised destination? If yes, proceed to E4, otherwise if not, proceed to E11.

E4. Determine a set of one or more authorised destination IP address(es) associated with the URL destination that URL should resolve to, and/or authorised destinations that the HTTP request packet(s) should or is supposed to traverse before reaching the originally intended destination. Proceed to E5.

E5. Inspect the HTTP header(s) and/or IP headers of each intercepted HTTP request packet to determine the potential other destination(s) (e.g. proxy connection(s) including the connections associated with the hostname and destination fields of the packet header) the packet may traverse before reaching the originally intended destination, and/or may have traversed before being intercepted.

E6. Determine IP address(es) of the other destination(s).

E7. Compare other destination(s) IP address(es) (e.g. hostname and destination IP address) with the set of authorised IP addresses. For example, compare the proxy connection IP address(es) with the set of authorised IP addresses. Proceed to E8.

E8. Check whether each of all of the other destination IP address(es) match or at least partially match one or more of the set of authorised destination IP address(es). If there is a match or at least a partial match, i.e. yes, then proceed to E11, otherwise if not, then proceed to E9.

E9. Determine that the intercepted packet is associated with redirection based on unauthorised destination(s). Proceed to E10.

E10. Block the intercepted packets associated with redirection based on the unauthorised destination. Proceed to E1.

E11. Send the intercepted packets towards the destination. Proceed to E1.

Alternatively, in step E3, it may be decided to block all communications to unauthorised destinations, so step E3 may be modified to proceed to E9, instead of E11. Additionally or alternatively, in step E10 may be modified such that those detected intercepted packets associated with redirection based on the unauthorised destination may be corrected/modified such that the packet is sent via authorised destinations towards the originally intended destination.

Although HTTP request packets have been used in the examples and embodiments as outlined with respect to figures herein, it is to be appreciated by the skilled person that HTTP request packets have been used for simplicity and, by way of example only, and the process can be modified to handle intercepting further other types of packets such as HTTP response packets.

Figure 6:
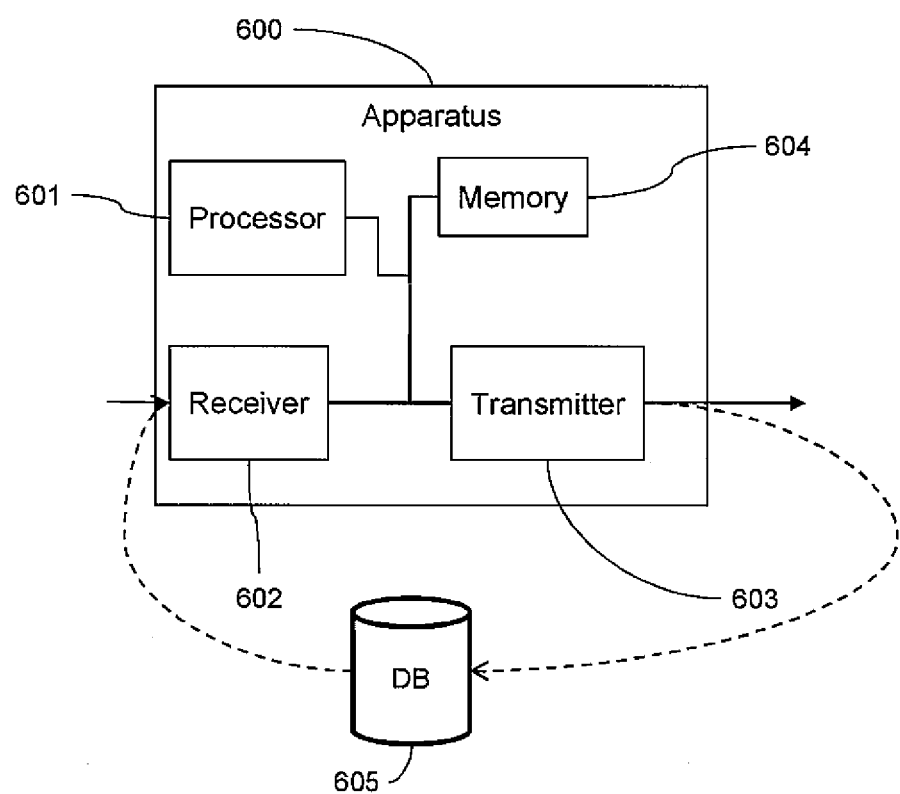
FIG. 6 illustrates schematically an example apparatus according to the invention.

FIG. 6 is a schematic illustration of an example apparatus 600 (e.g. process/apparatus 200a-200d) according to the invention for detecting and preventing unauthorised or malicious redirection of packets in a communications network. The apparatus 600 is implemented as a combination of computer hardware and software. The apparatus includes a processor 601, receiver 602, memory 604, and transmitter 603. The memory 604 stores the various programs/executable files that are implemented by the processor 601. The programs/executable files stored in the memory 604, and implemented by the processor 601, may include an interception unit, inspection/detection unit, and blocking unit. In addition, the programs/executable files stored in memory 604, and implemented by the processor 601 may also include a detection procedure unit and/or other destination procedure unit. The processor 601 is coupled to the receiver 602, memory 604, and transmitter 603. The transmitter 603 and receiver 602 may form a transceiver unit and are used for communicating with other systems, apparatus, and destination devices over a communication network. The apparatus may also include a database 605 or alternatively may be communicatively coupled to a database 605.

In operation, the memory 604 may include computer program instructions which, when executed on processor 601, perform the methods, processes, and procedures as described herein. The receiver 602 and processor 601 may be configured or caused by interception unit to receive a plurality of packets generated by one or more devices. The processor 601 is configured or caused by inspection/detection unit, and possibly detection procedure unit and/or other detection procedure unit, to inspect and detect whether at least one of the intercepted packets is associated with redirection based on an unauthorised destination. The processor 601 and/or the transmitter 603 are configured or caused by the blocking unit to block those detected intercepted packets associated with redirection based on the unauthorised destination. Alternatively, the processor 601 may be configured to correct/modify those detected intercepted packets associated with redirection based on the unauthorised destination such that the packets are sent via authorised destinations towards the originally intended destination.

In other aspects or examples of the apparatus, the processor 601 is may be further configured to use packet and protocol inspection to determine the originally intended destination of the packet and to determine any other destination(s) associated with redirection of the packet. The processor 601 may then be configured to, for each intercepted packet, determine that said each intercepted packet is associated with redirection to an unauthorised destination when any other destination(s) are not associated with one or more authorised destinations corresponding to the originally intended destination.

The processor 601 may be configured by the detection procedure unit to perform the following. For each intercepted packet: inspect the intercepted packet to determine the originally intended destination of the intercepted packet; inspect the header(s) of the intercepted packet to determine a set of other destinations, wherein the set of other destinations comprise any other destination(s) associated with the intercepted packet excluding the originally intended destination; determine whether at least one destination in the set of other destinations is associated with an unauthorised destination; and determine that the intercepted packet is associated with redirection based on the unauthorised destination when said at least one destination in the set of other destinations is associated with the unauthorised destination.

Additionally, the processor 601 may be configured to perform the following. For each intercepted packet, determine a set of one or more authorised destination addresses associated with the originally intended destination of the intercepted packet; compare the set of one or more authorised destination address(es) with address(es) of the set of other destinations; determine that at least one destination of the set of other destinations is associated with an unauthorised destination when the set of authorised destination addresses are not associated with the address(es) of the set of other destinations.

The processor 601 may be further configured, when comparing, to determine whether all addresses of the set of other destinations map onto one or more authorised destination address(es) of the set of authorised destination addresses, and determine that at least one destination of the set of other destinations is associated with an unauthorised destination when at least one address of the set of other destinations does not map onto one or more authorised destination address(es) of the set of authorised destination addresses.

Additionally or alternatively, the processor 601 may be configured, if a set of authorised destinations of where each packet is supposed to go that is associated with each originally intended destination is determined, to modify or correct the intercepted packets that are determined to be redirected to unauthorised domains such that these packets are sent via authorised destinations to the originally intended destination.

If the processor 601 determines that the intercepted packet(s) are redirected based on unauthorised destination(s), then the processor 601 and transmitter 603 may be configured to notify the device that generated the packet that it may be infected with malware or to prompt the user or antivirus/malware software (or other software) to detect and remove the malware and/or find and correct the cause of the redirection based on unauthorised destinations.

Alternatively or additionally, the processor 601, receiver 602 and transmitter 603 may be further configured or caused to perform the steps or operations of the processes/apparatus as described with reference to FIGS. 2 to 5. For example, the memory 604 may be configured to maintain a database of authorised destinations where each authorised destination record in the database includes a list of authorised destination addresses. Additionally or alternatively the processor 601, receiver 602, and transmitter 603 may be configured to maintain and/or query a database 605 of authorised destinations that may be separate from the memory 604 of apparatus 600.

The server system, servers, devices, destination devices, client devices, apparatus, gateways and other network elements or entities, internet service provider systems, database systems, computing systems as described herein each may perform or contribute to the detection and prevention of unauthorised or malicious redirection or routing of packets in a communication network. The processors of such systems are configured to execute computer program instructions based on the methods and processes described herein, such instructions being contained in a non-transitory computer-readable medium, such as memory. The computer program instructions may be read into memory from another computer-readable medium or from another device via a communication interface. The instructions contained in memory cause the processor of a destination device, a server, a device, a client device, detection/prevention apparatus, service provider system or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The non transitory computer readable medium may include computer program instructions stored thereon, which when executed on one or more processors of a server, server system, or other computing system, performs the processes or method steps of detecting and preventing unauthorised or malicious redirection of packets in a communication system by intercepting the packets, determining those packets that are associated with unauthorised redirection, and blocking those packets being transmitted over the communications network as described herein with reference to FIGS. 2-6. In addition, a computer readable medium including computer program instructions stored thereon, which when executed on one or more processors of a device, performs the processes or method steps of detecting and/or preventing unauthorised redirection of packets in a communication network as described herein.

Although HTTP request packets have been used in the examples and embodiments as described herein, it is to be appreciated by the skilled person that HTTP request packets have been used for simplicity and, by way of example only, and the methods, processes and apparatus as described herein may be used to handle any type of communications protocol or packets such that addressing and/or redirection/routing information associated with the originally intended destination and the other destinations may be determined through packet inspection and compared against authorised addressing and/or redirection/routing information for determining whether the packets are associated with redirection based on an unauthorised destination.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein without departing from the scope of the present invention.

The invention claimed is:

1. A method of detecting unauthorized redirection of Internet Protocol (IP) packets transmitted in a communication network, the method comprising, at a computer, performing the steps of:
   intercepting a plurality of IP packets generated by the computer, or by another computer connected to it via the communication network, and intended to be directed via one or more authorized destinations towards an original destination;
   inspecting the intercepted IP packets to determine a URL (Uniform Resource Locator) or IP address of the original destination;
   determining, based on said URL or IP address of the original destination, a set of IP addresses of authorized destinations associated with the original destination;
   for each of the intercepted IP packets, inspecting a header of the intercepted IP packets to determine a set of IP addresses of other destinations the intercepted IP packet has traversed or will traverse, and comparing the set of IP addresses of other destinations to the set of IP addresses of authorized destinations and determining whether the intercepted IP packet is being redirected via an unauthorized destination which is not one of the authorized destinations, and
   blocking those detected intercepted IP packets associated with redirection via the unauthorized destination or modifying those detected intercepted IP packets such that they are directed via only authorized destinations.

2. The method as claimed in claim 1, wherein the steps of inspecting comprise using IP packet and protocol inspection;
   wherein, for each intercepted IP packet, if the any other destination(s) are not associated with one or more authorized destinations corresponding to an originally intended destination, then said each intercepted IP packet is associated with redirection to the unauthorized destination.

3. The method as claimed in claim 1 the step of comparing further comprising, for each intercepted IP packet:
   determining whether at least one destination in the set of other destinations is associated with the unauthorized destination; and
   determining that the intercepted IP packet is associated with redirection via the unauthorized destination when said at least one destination in the set of other destinations is not associated with one or more authorized destinations of a set of authorized destinations corresponding to the originally intended destination.

4. The method as claimed in claim 1, wherein the step of comparing the IP addresses of other destinations to the IP addresses of authorized destinations comprises:
   if the set of authorized destination addresses are not associated with the set of other destinations addresses, determining that at least one destination of the set of other destinations is associated with the unauthorized destination.

5. The method as claimed in claim 4, wherein:
   the step of comparing the set of authorized destination addresses further comprises determining whether all addresses of the set of other destinations map onto one or more authorized destination address(es) of the set of authorized destination addresses;
   if at least one address of the set of other destinations does not map onto one or more authorized destination address(es) of the set of authorized destination addresses, then determining that at least one destination of the set of other destinations is associated with the unauthorized destination.

6. The method as claimed in claim 4, wherein:
   the step of comparing the set of authorized destination addresses further comprises, for each address of the set of other destinations, determining whether said each address matches one or more authorized destination address(es) of the set of authorized destination addresses, determining that at least one destination of the set of other destinations is associated with the unauthorized destination when said each address does not match said one or more authorized destination address(es).

7. The method as claimed in claim 4, wherein:
   the step of comparing the set of authorized destination addresses further comprises, for each address of the set of other destinations, determining whether said each address at least partially matches one or more authorized destination address(es) of the set of authorized destination addresses, determining that at least one destination of the set of other destinations is associated with the unauthorized destination when said each address does not at least partially match said one or more authorized destination address(es).

8. The method as claimed in claim 1, wherein determining a set of one or more authorized destination addresses comprises generating said set of one or more authorized destination addresses from data derived from destination name server responses associated with the original destination, and wherein the destination name servers are trusted destination name servers.

9. The method as claimed in claim 1, and comprising maintaining a list of authorized destinations, wherein the list comprises the set of IP addresses of the authorized destinations, and wherein the step of comparing the set of IP addresses of other destinations to the set of IP addresses of authorized destinations further comprises checking that the original destination of the intercepted IP packet is associated with the list of authorized destinations comprised in a name server, wherein if the original destination of the intercepted IP packet is not associated with the list of authorized destinations, then blocking or correcting the intercepted IP packet.

10. The method as claimed in claim 9, further comprising maintaining a database of authorized destinations, wherein each authorized destination record in the database includes a list of authorized destination addresses, that are updated using destination addresses based on resolving the authorized destination in one or more geographical regions.

11. The method as claimed in claim 10, wherein maintaining the database of authorized destinations further includes, for each authorized destination record:
  retrieving destination name and address pairs from intercepted IP packets associated with the authorized destination record and updating the list of authorized destination addresses with a destination name and address pair when IP packets with the same destination name and address pair have been intercepted from more than two different devices; and
  generating a set of one or more authorized destination addresses from data derived from destination name server responses associated with the authorized destination record, wherein the destination name servers are trusted destination name servers; and updating the list of authorized destination name addresses with the set of one or more authorized destination addresses.

12. The method as claimed in claim 1, wherein the step of intercepting further comprises intercepting IP packets associated with Hypertext Transfer Protocol, HTTP.

13. The method as claimed in claim 12 wherein:
  the originally intended destination includes a universal resource locator, URL, or universal resource identifier, URI;
  the any other destination(s) include the hostname(s) and domain(s) or address(es) derived from a HTTP request and/or the Internet Protocol header of the IP packet.

14. The method as claimed in claim 1, wherein a destination is the unauthorized destination when it is determined that the destination is a malicious destination from a list of malicious destinations.

15. The method as claimed in claim 1, wherein said other destination(s) comprises:
  one or more proxy connection(s) that the intercepted IP packet will traverse before reaching the originally intended destination.

16. An apparatus configured to detect unauthorized redirection of IP packets transmitted in a communication network, the apparatus comprising a processor, a transmitter, a receiver and a non-transitory computer readable memory, the processor coupled to the transmitter, the receiver and the non-transitory computer readable memory, wherein:
  the receiver is configured to intercept a plurality of IP packets generated by one or more hardware devices and intended to be directed via one or more destinations towards an original destination;
  the processor is configured to:
    inspect the intercepted IP packets to determine a URL or IP address of the original destination;
    determine, said URL or IP address of the original destination, a set of IP addresses of authorized destinations associated with the original destination;
    for each of the intercepted IP packets, inspect a header of the intercepted IP packets to determine a set of IP addresses of other destinations the intercepted IP packet has traversed or will traverse, and compare the set of IP addresses of other destinations to the set of IP addresses of authorized destinations and determine whether the intercepted IP packet is being redirected via an unauthorized destination which is not one of the authorized destinations, and
  the processor and transmitter are configured to block those detected intercepted IP packets associated with redirection via the unauthorized destination or to modify those detected intercepted IP packets such that they are directed via only authorized destinations.

17. The apparatus as claimed in claim 16, wherein the processor is configured to, for each intercepted IP packet:
  determine whether at least one destination in the set of other destinations is associated with the unauthorized destination; and
  determine that the intercepted IP packet is associated with redirection via the unauthorized destination when said at least one destination in the set of other destinations is associated with the unauthorized destination.

18. The apparatus as claimed in claim 17, wherein the processor is configured to, for each intercepted IP packet:
  compare the set of one or more authorized destination address(es) with address(es) of the set of other destinations, determine whether all addresses of the set of other destinations map onto one or more authorized destination address(es) of the set of authorized destination addresses and determine that at least one destination of the set of other destinations is associated with an unauthorized destination when at least one address of the set of other destinations does not map onto one or more authorized destination address(es) of the set of authorized destination addresses; and
  determine that at least one destination of the set of other destinations is associated with the unauthorized destination when the set of authorized destination addresses are not associated with the address(es) of the set of other destinations.

19. The apparatus as claimed in claim 16, further comprising maintaining a database of authorized destinations, wherein each authorized destination record in the database includes a list of authorized destination addresses.

20. A client device comprising the apparatus as claimed in claim 16.

21. A server or gateway comprising the apparatus as claimed in claim 16.

22. A computer program product comprising a non-transitory computer readable medium and a computer program which, when run on an apparatus, causes the apparatus to perform the method of claim 1.

* * * * *